United States Patent [19]

Koga et al.

[11] Patent Number: 5,082,752
[45] Date of Patent: Jan. 21, 1992

[54] POWER GENERATION SYSTEM USING MOLTEN CARBONATE FUEL CELL

[75] Inventors: Minoru Koga, Kawasaki; Takenori Watanabe, Ichikawa; Toshio Kamata, Tokyo; Satoshi Morishima, Kashima; Minoru Mizusawa; Kazunori Kobayashi, both of Yokohama, all of Japan

[73] Assignee: Ishikawajima-Harima Heavy Industries Co., Ltd., Tokyo, Japan

[21] Appl. No.: 615,013

[22] Filed: Nov. 16, 1990

[30] Foreign Application Priority Data

Nov. 25, 1989 [JP] Japan .................................. 1-305584

[51] Int. Cl.$^5$ .............................................. H01M 8/14
[52] U.S. Cl. ....................................... 429/20; 429/16; 429/26
[58] Field of Search ....................... 429/19, 20, 26, 17, 429/16, 34

[56] References Cited

U.S. PATENT DOCUMENTS

| 4,182,795 | 1/1980 | Baker et al. | 429/26 |
| 4,917,971 | 4/1990 | Farooque | 429/26 |

FOREIGN PATENT DOCUMENTS

| 0017570 | 1/1982 | Japan | 429/26 |
| 0119167 | 7/1983 | Japan | 429/26 |

*Primary Examiner*—Anthony Skapars
*Attorney, Agent, or Firm*—Trexler, Bushnell, Giangiorgi & Blackstone, Ltd.

[57] ABSTRACT

A power generation system uses fuel cells stacked via separators. Cooling plates are provided in the fuel cell stack. Passages are formed in each cooling plate for allowing raw-material-gas-for-reformation (which also serves as stack-cooling-gas) to flow therethrough and the passages are filled with reforming catalyst. An external reformer which includes a combustion section and a reforming section is provided outside of the fuel cell stack. A stack-cooling-gas-line is connected to the passages of the cooling plates for introducing the raw-material-gas-for-the-reformation (the stack-cooling-gas) into the passages. A line for gas-for-processing is connected to the reforming section of the external reformer for feeding raw-material-gas-for-processing to the reforming section. An anode gas feed line is provided for feeding to the anode the reformed gas which has been reformed through the passages of the cooling plates and the reformed gas which has been reformed by the reforming section of the external reformer. An anode exit gas line is provided for feeding the anode exit gas to the combustion section of the external reformer. A cathode gas feed line is provided for feeding the combustion exhaust gas discharged from the combustion section to the cathode with air. A cathode exit gas line is provided for discharging the cathode exit gas.

7 Claims, 9 Drawing Sheets

POWER GENERATION SYSTEM USING MOLTEN CARBONATE FUEL CELL

BACKGROUND OF THE INVENTION

1. Technical Field

The present invention relates to a power generation system using molten carbonate fuel cells.

2. Background Art

A fuel cell directly transforms chemical energy of fuel into electrical energy. There are proposed a lot of power generation systems using fuel cells and a molten carbonate fuel cell system is a typical one of them. The molten carbonate fuel cell includes a stack of fuel cells with separators being interposed between two adjacent fuel cells. The fuel cell generally includes an anode (fuel electrode), a cathode (oxygen electrode) and an carbonate-soaked electrolyte (tile) sandwiched by the anode and the cathode. Oxidant gas is supplied to the cathode and fuel gas is supplied to the anode such that the power generation takes place due to a potential difference between the cathode and the anode.

Figure 9:
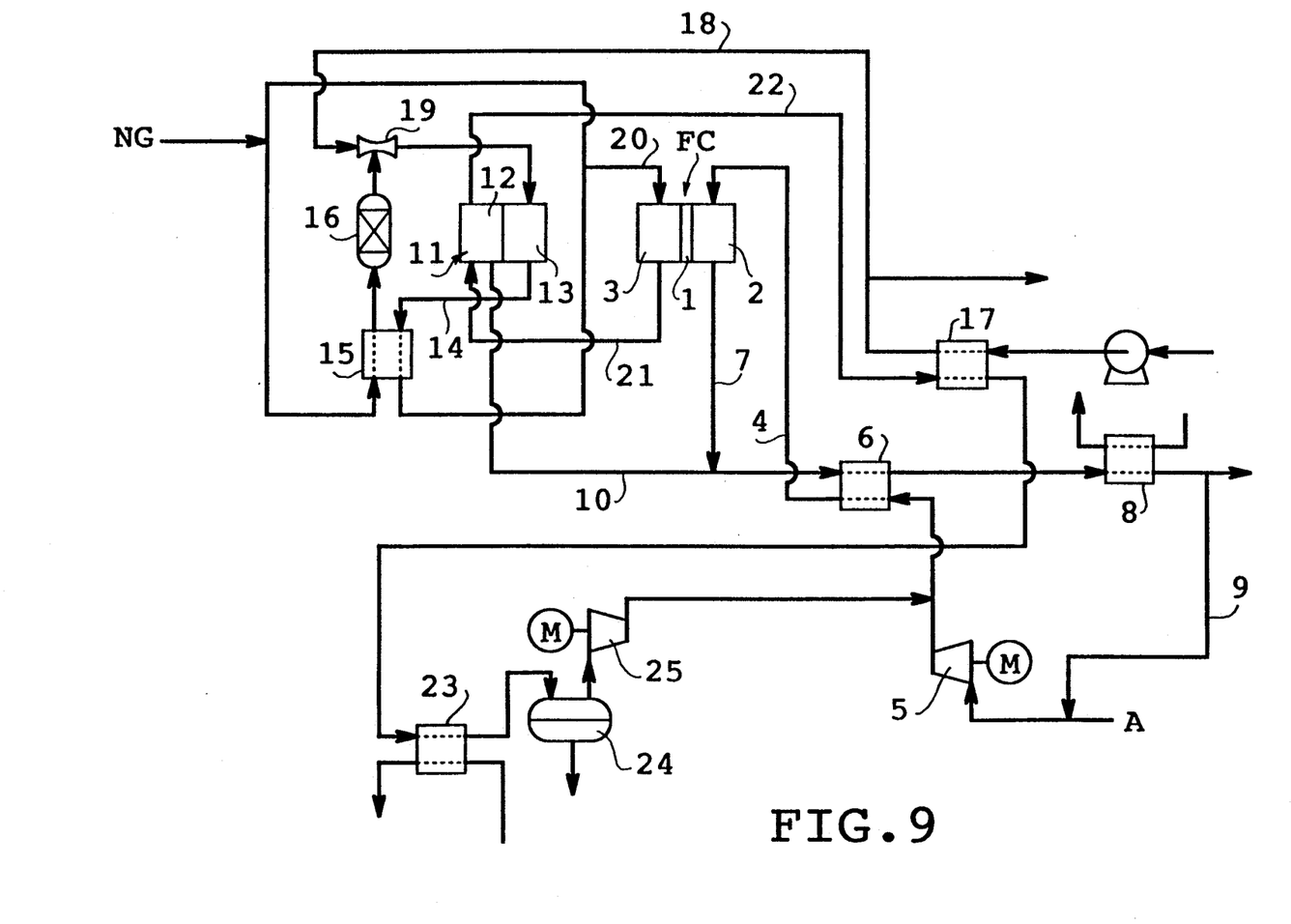
FIG. 9 illustrates a block diagram of a conventional cathode recycle type fuel cell power geration system.

One example of the conventional molten carbonate fuel cell power generation system is illustrated in FIG. 9 of the accompanying drawings. This system is generally called "cathode recycle type". The fuel cell FC includes a plurality of fuel cells. Each fuel cell includes an electrolyte tile 1 sandwiched by a cathode 2 and an anode 3. The fuel cells are stacked with separators being interposed between two adjacent fuel cells. Air A is pressurized by a blower 5 provided on an air feed line 4 and preheated by an air preheater 6 before it is fed to the cathode 2 as the oxidant gas. Cathode exhaust gas discharged from the cathode 2 flows through a line 7 to the air preheater 6 and a heat exchanger 8 and then is expelled to atmosphere. Part of the cathode exhaust gas is fed back to the air feed line 4 via a branch line 9 and recirculated to the cathode 2 again. Another part of the cathode exhaust gas is introduced to a combustor section 12 of a reformer 11 by a line 10 branched from the line 7.

On the other hand, natural gas NG supplied to the anode 3 of the fuel cell FC is mixed with part of reformed gas, which is discharged from a reforming section 13 of the reformer 11 into a reformed gas line 14, and accordingly sulfur or sulfides contained in natural gas is transformed to hydrogen sulfide. The hydrogen sulfide, which has passed through a natural gas preheater (furnace) 15, is desulfurized by a desulfurizer 16, and the natural gas, after the desulfurization, is introduced to an ejector 19. The ejector 19 guides thereinto steam from the boiler 17 through a steam line 18. The steam is introduced to the reforming section 13 with the natural gas. In the reforming section 13, the natural gas and the steam undergo a reforming reaction to be transformed to hydrogen, carbon monoxide, carbon dioxide and so on. Most of reformed gases is led to the anode 3 of the fuel cell FC through another reformed gas feed line 20 branched from the reformed gas line 14. Anode exhaust gas discharged from the anode 3 contains unreacted $H_2$ and CO so that the anode exhaust gas is introduced to the combustion section 12 of the reformer 11 through an anode exhaust gas line 21 and combusted therein with air contained in the cathode exhaust gas of the branch line 10. Combustion exhaust gas discharged from the combustion section 12 of the reformer 11 enters the boiler 17 and then a condenser 23 through an exhaust gas line 22. The exhaust gas is cooled and condensed to water by the condenser 23. Then, the gas and the water are separated from each other by a gas-liquid separator 24. The gas is pressurized by the blower 25 and fed to the cathode 2 through the air feed line 4. In this manner, a large amount of oxidant gas is recirculated to the cathode 2 to cool the fuel cell stack.

In the above-described fuel cell system, the oxidant gas containing $CO_2$ and $O_2$ is fed to the cathode 2 so that a reaction of:

$$CO_2 + \tfrac{1}{2}O_2 + 2e^- \rightarrow CO_3^{--}$$

takes place at the cathode 2, thereby producing carbonate ion $CO_3^{--}$. $CO_3^{--}$ transports in the electrolyte plate 1 and reaches the anode 3. On the other hand, the reformed gas containing $H_2$, CO and $CO_2$ supplied to the anode 3 undergoes a reaction of:

$$CO_3^{--} + H_2 \rightarrow H_2O + CO_2 + 2e^-$$

whereby hydrogen gas is mainly consumed to produce water and carbon dioxide.

The anode exhaust gas contains unreacted $H_2$ and CO. Thus, the anode exhaust gas is introduced to the combustion section 12 of the reformer 11 and mixed with the cathode exhaust gas containing the unreacted $O_2$ to be burned. Heat generated upon this combustion causes the reforming reaction at the reforming section 13 whereby the natural gas NG is reformed to $H_2$, CO and $CO_2$.

In the above-explained cathode recycle type power generation system, the pressure difference between the anode 3 and the cathode 2 becomes small since the anode exhaust gas and the cathode exhaust gas are mixed to each other in the combustion section 12 of the reformer 11, and a high power generation efficiency is obtained by raising a concentration of the carbon dioxide of the cathode 2 entrance since the combustion exhaust gas from the combustion section 12 of the reformer 11 and the cathode exhaust gas are recirculated to the cathode 2.

Figure 10:
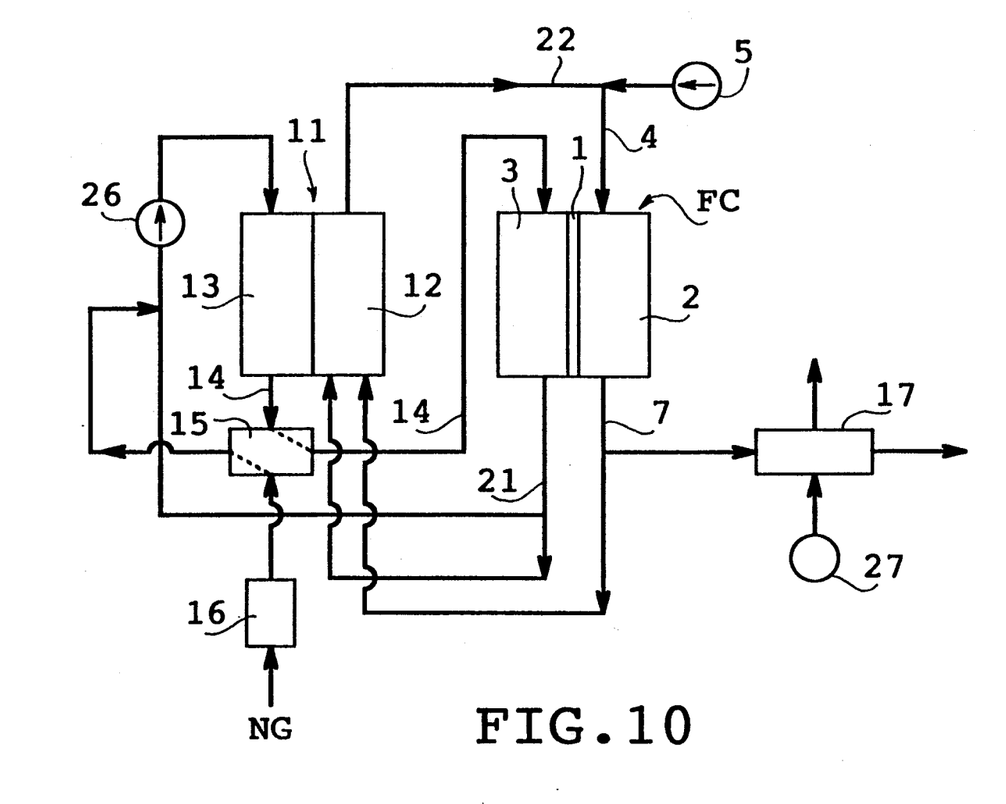
FIG. 10 illustrates a block diagram of a conventional anode recycle type fuel cell power geration system.

FIG. 10 also a conventional power generation system. This one is generally called "anode recycle type". An anode recycle loop is formed by the anode 3 of the fuel cell FC, the anode exit gas line 21, the blower 26, the reforming section 13 of the reformer 11 and the reformed gas line 14 which feeds the reformed gas to the anode 3. The natural gas NG flows through the desulfurizer 16 and the heat exchanger 15 before reaching the anode exit gas line 21 of the anode recycle loop. On the other hand, the oxidant gas to be fed to the cathode 2 is, after pressurized by the blower 5, mixed with the combustion exhaust gas discharged into the exhaust gas line 22 from the combustion section 12 of the reformer 11 and then fed to the cathode 2 through the air feed line 4. Part of the cathode exit gas is guided to the boiler 17, in which it is subjected to an heat exchange with the water fed from a pump 27 thereby producing steam which is used for certain purposes before expelled to the atmosphere. Part of the cathode exit gas is introduced to the combustion section 12 of the reformer 11 through the cathode exit line 7 such that the unreacted gases of the anode gas and the cathode exit gas are combusted at the combustion section 12 to produce heat, which heat is absorbed by the reforming section 13 to ensure the reforming reaction.

Figure 11:
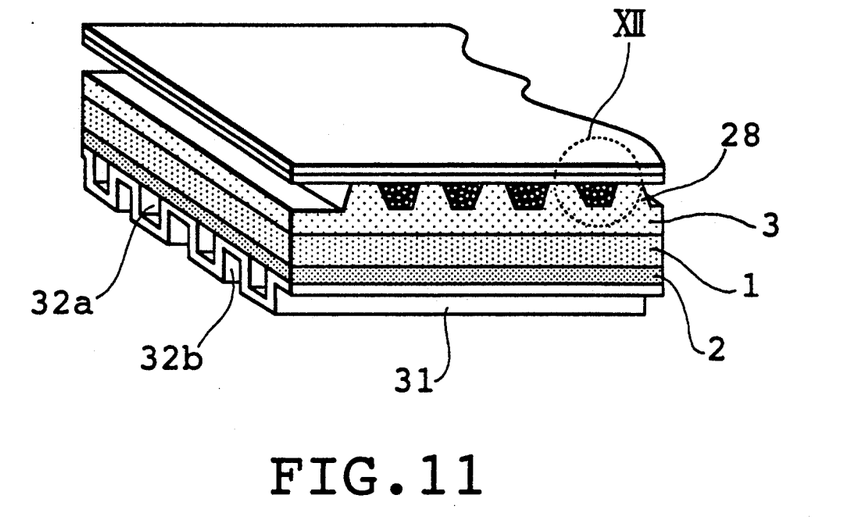
FIG. 11 illustrates an internal reformation type fuel cell.
Figure 12:
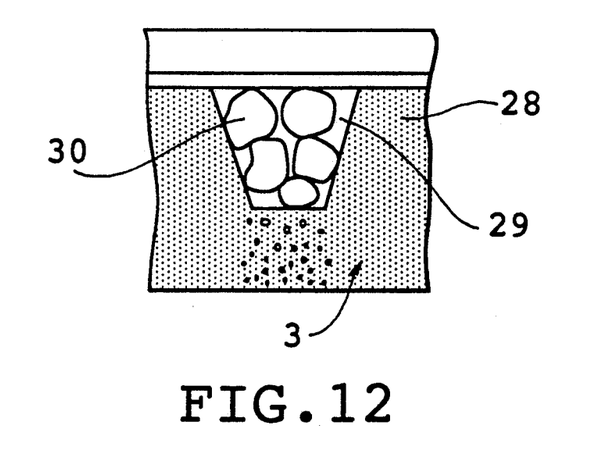
FIG. 12 is an enlarged view of the part XII of FIG. 11.

Conventionally, an internal-reforming-type fuel cell has been also developed. This fuel cell functionally combines the fuel cell stack with the reformer. As illustrated in FIGS. 11 and 12, the anode 3 having a rib 28 is employed. The fuel cell elements (each element includes the cathode 2, the anode 3 and the electrolyte plate 1 sandwiched by the cathode 2 and the anode 3) are stacked via the separators 31, like other conventional fuel cells, but since the each anode 3 has the rib 28, fuel gas passages 29 are formed by the ribs 28. Reforming catalyst (alumina substrate and Ni) 30 is placed in the passage 29 so that the passage 29 serves as the reformer. The natural gas and the steam are fed into the passage 29 as the fuel gas and the oxidant gas is fed to a gas passage 32a defined by the separators 31 whereby the reforming reaction at the anode 3 and the electrochemical reaction between the anode 3 and the cathode 2 takes place simultaneously. Meanwhile, numeral 32b designates a cooling air passage.

In the above-described internal-reforming-type fuel cell, the reforming reaction and the electrochemical reaction occur at the same time. Therefore, the reforming reaction proceeds beyond a methane conversion ratio determined by chemical equilibrium temperature since hydrogen and carbon monoxide are consumed at these reactions. Accordingly, a high methane conversion ratio is obtained at a relatively low temperature. In addition, the electrochemical reaction is an exothermic reaction while the reforming reaction is an endothermic reaction so that a high power generation efficiency is achieved by a balanced operation.

However, in the cathode recycle type system shown in FIG. 9, the generating end efficiency is 45.5% at HHV (anode fuel utilization efficiency is 80%, current density is 150 mA/cm$^2$ and reformer steam/carbon ratio (s/c ratio) is 3) and the cell output voltage is 0.69 V. These values are considered to be low values. This is because although the combustion exhaust gas discharged from the combustion section 12 of the reformer is condensed to remove the water and is recirculated to the cathode 2 with part of the cathode exit gas, which part of the cathode exit gas is cooled before it is recirculated to the cathode 2, in order to raise the $CO_2$ concentration at the cathode entrance, the $CO_2$ concentration at the cathode entrance reaches only 11.3%, i.e., the $CO_2$ concentration is still low. Also, when a flow rate of the air pressurized by the blower 5 and the air pressurized by the other blower 25 and then recirculated to the cathode 2 is set to 20 mol/m, the flow rate of the gas at the cathode exit becomes as much as 17.6 mol/m so that the power consumption of the blowers 5 and 25 is raised and as a result the power consumption of the system is raised and the sending end efficiency is lowered. In addition, since the cell output voltage is low, it is not possible to raise the current density and therefore the plant cannot be designed to be compact.

In the anode recycle type system of FIG. 10, the cooling of the fuel cell stack mainly depends on the anode recycle gas and the heat required for the reforming reaction mainly depends on the sensible heat (of a temperature of about 700° C.) of the anode exit gas. Therefore, there are following disadvantages:

(i) The anode exit gas which contains reacted gas such as KOH or carbonate vapor poisons the catalyst of the reforming section of the reformer 11;

(ii) The anode recycle loop is a high temperature recycle loop and the loss of the blower 26 used for the anode recycle loop increases as the gas temperature rises if the pressure loss of the anode recycle loop is constant. Specifically, there is a loss of three times ((273+550)/273≈3) as much as the one of ordinary or room temperature;

(iii) Since the anode gas which contains low concentration of $H_2$ and CO is recirculated, the $H_2$ and the CO concentrations at the anode entrance are lowered which in turn lowers the cell voltage; and (iv) At the anode 3, the carbonate ion $CO_3^{--}$ from the cathode 2 reacts with the hydrogen gas to produce $H_2$ and $CO_2$ so that the temperature boundary layer becomes thicker. Thus, it is disadvantageous to perform the cooling of the fuel cel stack on the anode 3 side since the heat transfer coefficient of the anode 3 is small as compared with the cathode 2.

Furthermore, in the internal reforming type fuel cell system of FIG. 11, since the reforming catalyst 30 is placed in the gas passage of the anode 3, the catalyst becomes wet due to the carbonate. Accordingly, the catalyst is damaged. Also, the control of the temperature inside the fuel cell stack is difficult.

SUMMARY OF THE INVENTION

An object of the present invention is to provide a power generation system using internal reforming type fuel cells, which does not allow the reforming catalyst to contact the carbonate.

Another object of the present invention is to provide a power generation system using a stack of internal reforming type fuel cells, which allows an easy control of the temperature inside the fuel cell stack.

Still another object of the present invention is to provide a power generation system using molten carbonate fuel cells, whose power generation efficiency is higher than the conventional ones.

According to one aspect of the present invention, there is provided a power generation system using fuel cells, the system including a plurality of molten carbonate fuel cells, the fuel cells being stacked one after another via separators, each fuel cell having a cathode electrode, an anode electrode and a carbonate-soaked electrolyte plate sandwiched by the cathode and the anode electrodes, oxidant gas being fed to the cathode and fuel gas being fed to the anode, characterized in that cooling plates are provided between predetermined pairs of two adjacent fuel cells, that a plurality of passages are formed in each cooling plate for allowing raw-material-gas-for-reformation (which also serves as stack-cooling-gas) to flow therethrough, that the passages are filled with reforming catalyst, that an external reformer is provided outside of the fuel cell stack, the external reformer having a reforming section and a combustion section next to each other, that a stack-cooling-gas-line is connected to the above-mentioned passages formed in the cooling plates for introducing the raw-material-gas-for-the-reformation (the stack-cooling-gas) into the passages of the cooling plates, that a line for gas-for-processing is connected to the reforming section of the external reformer for feeding raw-material-gas-for-processing to the reforming section, that an anode gas feed line is provided for feeding to the anode the reforming gas which has been reformed through the passages of the cooling plates and the reforming gas which has been reformed by the reforming section of the external reformer, that an anode exit gas line is provided for feeding the anode exit gas to the combustion section of the external reformer, that a cathode gas feed line is provided for feeding the combustion exhaust gas discharged from the combustion section to the cathode with air and that a cathode exit gas line is provided for discharging the cathode exit gas.

According to this system, the raw material gas for the reformation (the stack cooling gas) is supplied to the cooling plates provided in the fuel cell stack and the the raw material gas is reformed by the reforming catalyst placed in the cooling plates. The cooling of the fuel cell stack is performed by the endothermic reaction which takes place as the raw material gas is reformed. In this case, since the reforming catalyst is placed in the passages defined in the cooling plates, the reforming catalyst is completely insulated from the carbonate. Thus, the catalyst is not poisoned by the carbonate. Also, the temperature distribution in the vertical direction inside the fuel cell stack is easily controlled by adjusting a ratio of the flow rate of the raw material gas for the reforming (and for the processing) to be fed to the external reformer and the flow rate of the raw material gas for the reforming (and for the stack cooling) to be fed to the cooling plates. Moreover, when the combustion exhaust gas is fed to the cathode, the pressurized air (driving fluid) is fed to the ejector, so that the control of the pressure difference between the anode and the cathode inside the stack can be performed by the ejector. In addition, the reformed gas from the cooling plates may be returned to the entrance of the reforming section of the reformer. In such a case, it is possible to select the reforming ratio (or reformer conversion ratio) of the cooling plates regardless of the stack exit temperature.

DESCRIPTION OF THE PREFERRED EMBODIMENTS

Preferred embodiments of the present invention will now be described with reference to the accompanying drawings.

Figure 1:
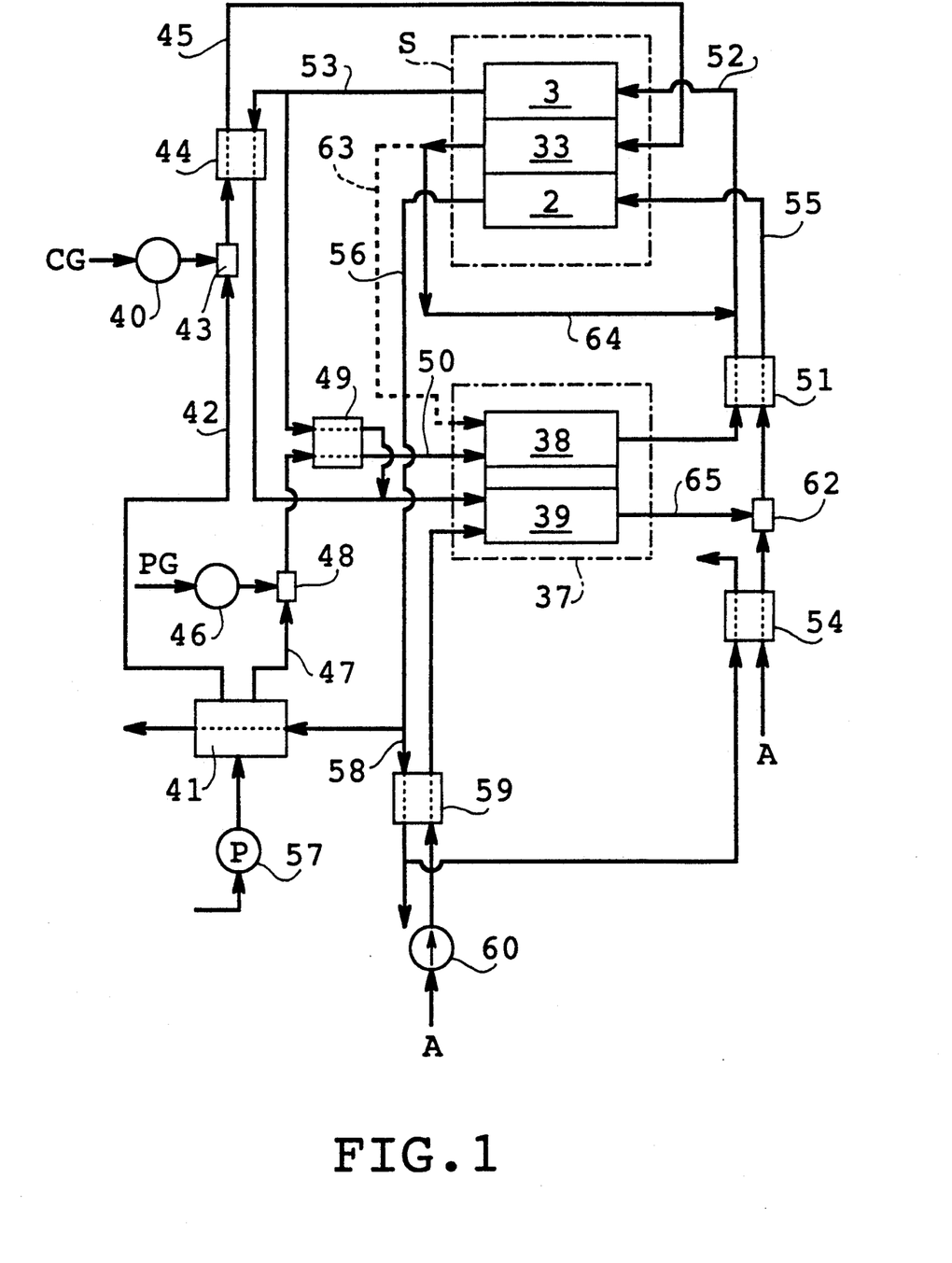
FIG. 1 is a block diagram of a power generation system using molten carbonate fuel cells according to the present invention.
Figure 2:
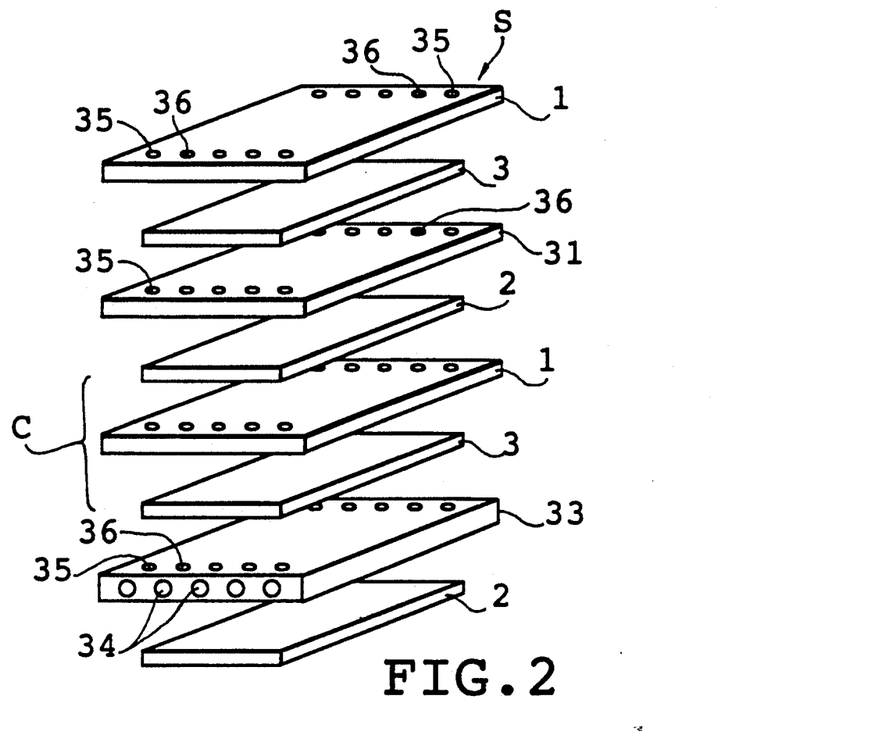
FIG. 2 is a perspective view of an indirect-internal-reforming type fuel cell stack.

Referring to FIG. 1, there is shown a block diagram of a power generation system using molten cabronate fuel cells according to the present invention. As shown in FIG. 2, the molten carbonate fuel cell C includes an electrolyte plate (tile) 1 sandwiched by a cathode electrode 2 and an anode electrode 3. A plurality of fuel cells C are stacked via separators 31 and then cooling plates 33 are inserted between several two adjacent fuel cells C thereby forming an indirect internal reforming type fuel cell stack S. Reforming catalyst 61 is placed in gas passages 34 formed in the cooling plate 33. The gas passages 34 extend through the cooling plate 33. Oxidant gas is fed to the cathode 2 of each fuel cell C and fuel gas is fed to the anode 3 through oxidant gas feed and discharge manifold 35 and fuel gas feed and discharge manifold 36 respectively formed along peripheries of the electrolyte tile (plate) 1, the separator 31 and the cooling plate 33. Outside the indirect internal reforming type fuel cell stack S, there are provided an external reformer which includes a reforming section 38 and a combustion section 9 placed next to each other. Raw material gas (natural gas) CG for the reformation and/or for the stack-cooling is desulfurized by a desulfurizer 40. The raw material gas CG and the steam (driving fluid) fed through a steam line 42 from a boiler 41 are mixed with each other at the ejector 43 and then preheated by a preheater 44 before fed to the gas passages 34 of the cooling plates 33 through a stack-cooling gas line 45. On the other hand, raw material gas (natural gas) PG for the reformation and/or the-external-reformer-processing is desulfurized by a desulfurizer 46. The raw material gas PG and steam (driving fluid) fed through another steam line 47 from the boiler 41 are mixed with each other at another ejector 48 and then preheated by another preheater 49 before being fed to a reforming section 37 of an external reformer 38 through a processing line 50. The reforming gas which is reformed in the cooling plates 33 and discharged into the line 64 is mixed with the reformed gas which is discharged from the reforming section 38 of the external reformer 37 and heat-exchanged at the air preheater 51, and then these gases are fed to the anode 3 through a gas line 52.

In the anode 3, a following reaction takes place:

After this reaction, the anode exit gas is discharged into an anode exit gas line 53 to flow through the preheaters 44 and 49 to reach the combustion section 39 of the external reformer 37. Air A is preheated by an air preheater 54 and then mixed with combustion exhaust gas discharged from the combustion section 39 of the external reformer 37 via a line 65. Theses gases are further preheated by the air preheater 51 and fed into a cathode gas feed line 55 to reach the cathode 2.

In the cathode 2, a following reaction takes place:

After this reaction, the cathode exit gas flows through a cathode exit gas line 56 and part of the cathode exit gas is introduced to the boiler 41 to heat and vaporize the water supplied from a pump 57 and further to feed the steam into the steam lines 42 and 47 whereas another part of the cathode exit gas is expelled to the atmosphere via a branch line 58, the preheater 59 and the air preheater 54. In the preheater 59, the cathode exit gas preheats air-for-combustion, which has been pressurized by a blower 60, to be fed to the combustion section 39 of the external reformer 37.

Figures 3, 4:
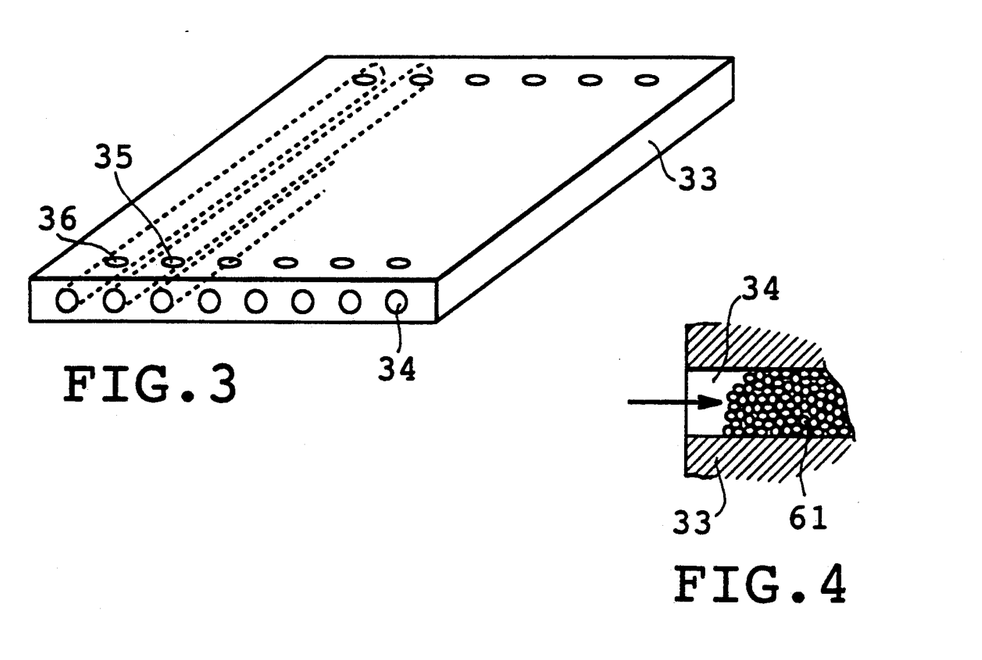
FIG. 3 is a perspective view of a cooling plate.
FIG. 4 is an enlarged view of a gas passage of FIG. 3.

FIGS. 3 and 4 show a detail of the cooling plate 33 interposed between predetermined number of two adjacent fuel cells C. Along the periphery of each cooling plate 33, there are formed a manifold 35 for the oxidantgas-feeding and a manifold 36 for the fuel-gas-feeding. The gas passage 34 extends in the cooling plate 33 to connect one opening of the manifold on one side with a corresponding opening of the same manifold on the other side. The reformed gas for the stack-cooling flows in the passages 34. The combustion catalyst 61 is filled with each passage 34 such that the reforming catalyst 61 does not directly contact the carbonate of the fuel cell and that the raw material gas for the reformation (natural gas), which is reformed with the steam, absorbs heat generated in the fuel cell and reformed as the raw material gas passes through the passages 34. The external reforming device 37 may have various configurations. For example, a plate type reforming device disclosed in Japanese Utility Model Registration Application No. 62-145404, which is owned by the present assignee.

Referring to FIG. 1 again, an ejector 62 is provided on the cathode feed line 55 for introducing the air to the cathode 2 and the combustion exhaust gas from the combustion section 39 of the external reforming device 37 is guided to the ejector 62. The (pressurized) air, as the driving fluid, is fed to the cathode 2 from the ejector 62.

All or part of the reformed gas from the gas passage 34 of the cooling plate 33 may be introduced to the reforming section 38 of the external reformer 37 from the line 63 and then subjected to the reforming rection before fed to the anode 3.

In FIG. 1, the raw material gas CG for the reformation and for the stack-cooling to be fed to the cooling plate 33 inserted into the fuel cell stack S flows through the desulfurizer 40 in which sulfide is directly absorbed by activated carbon or manganese dioxide to be removed from the raw material gas CG. The sulfide otherwise would deteriorate the reforming catalyst as well as the combustion catalyst. Next, the raw material gas for the reformation and for the stack-cooling is pressurized by the ejector 43 with the steam from the boiler 41 and introduced to the gas passage 34 of the cooling plate 33 via the preheater 44. The raw material gas CG for the reformation fed to the gas passage 34 flows contacting the reforming catalyst 61. At the same time, the raw material gas CG absorbs the heat of the fuel cell stack S to be transformed or reformed to $H_2$ and CO. The reforming reaction largely depends on a steam/carbon ratio, a temperature and a pressure. The gas reformed by the cooling plate 33 meets the reformed gas from the reforming section 38 of the external reformer 37 and then goes to the anode 3 of the fuel cell stack S.

On the other hand, the raw material gas PG (natural gas) for the reformation and for the processing flows through the desulfurizer 46, the ejector 48 and the preheater 49 to reach the reforming section 38 of the external reformer 37 in which the reforming reaction takes place. After that, the reformed gas is introduced to the anode 3. The reforming reaction in the reforming section 38 uses the heat produced upon the combustion of the anode exit gas at the combustion section 39 of the external reformer 37.

The reformed gas supplied to the anode 3 reacts with the carbonate ion $CO_3^{--}$ produced upon the reaction at the cathode 2, thereby producing $CO_2$ and $H_2O$. Since the anode exit gas contains unreacted $H_2$ and CO, the anode exit gas is heat-exchanged by the preheaters 44 and 49 and then introduced into the combustion section 39 of the external reformer 37. In this case, the flow rate of the raw material gas for the reformation of the external reformer 37 is smaller than a conventional cathode recycle type system so that less amount of unreacted $H_2$ and CO are required in the anode exit gas. Therefore, it is possible to set a fuel utilization ratio UF of the fuel cell stack to a high value, which in turn raises the power generation efficiency. Here, the fuel utilization ratio UF represents how much of the mol flow rate of $H_2+CO$ among the gases fed to the anode 3 is transformed to the current.

The combustion exhaust gas from the combustion section 39 of the external reformer 37 is mixed with the air A and these gases are fed to the cathode 2. In this case, the air serves as the driving fluid to feed the combustion exhaust gas into the cathode 2 with use of the ejector 62. Thus, it is possible to reduce the pressure difference between the anode 3 and the cathode 2. Also, it is possible to save cost without employing an expensive heat exchanger.

Now, as one example, result of an experiment using the system of FIG. 1 will be explained. In the experiment, the power generation output of the system was set to 2.11 kw, the current density to 105 $mA/cm^2$, the fuel utilization ratio (UF) to 80%, the steam/carbon ratio (s/c ratio) of the raw material gas (natural gas) for the reformation and for stack-cooling and the raw material gas for the reformation and for the processing to 3, the fuel cell entrance temperature to 550° C., the fuel cell exit temperature to 700° C., the external reformer entrance temperature 550° C., the external reformer exit temperature 720° C., an excessive ratio (EA) of air for the combustion section of the external reformer 37 to 1.2, the flow rate ratio (EJ) (air mol flow rate/external reformer combustion exhaust gas flow rate) of the ejector 62 to 1.0, the flow rate (CG) of the raw material gas for the reformation and the stack-cooling to 0.183 mol/m and the flow rate (PG) of the raw material gas for the reformation and the processing to 0.109 mol/m, i.e., the flow rate ratio to 0.183/0.109=63/37 (60% of the flow rate of the entire raw material gas for the reformation is used for the stack-cooling and 40% of the same is used for the processing). The experiment was conducted under the atmosphere pressure.

The gas concentrations at the entrance of the cathode 2 of the fuel cell stack S were as follows: $CO_2$ was about 17%, $H_2O$ was about 24%, $N_2$ was about 48%; and $O_2$ was about 11%. The value of "about 17%" of the $CO_2$ concentration is remarkably higher than the value of 11% of the conventional cathode recycle type system. The power generation efficiency and the cell voltage were also improved in comparison with the conventional cathode recycle type system. Specifically, the power generation efficiency EF of the present invention was 48.5% while that of the cathode recycle type system was 45.5%. The cell voltage VOLT of the present invention was 0.72 V while that of the cathode recycle type system was 0.69 V. In addition, since the gas flow rate of the present invention was smaller than one-third of the conventional system, the power consumed in the system is small and the sending end efficiency is high as compared with the conventional one.

Figure 5:
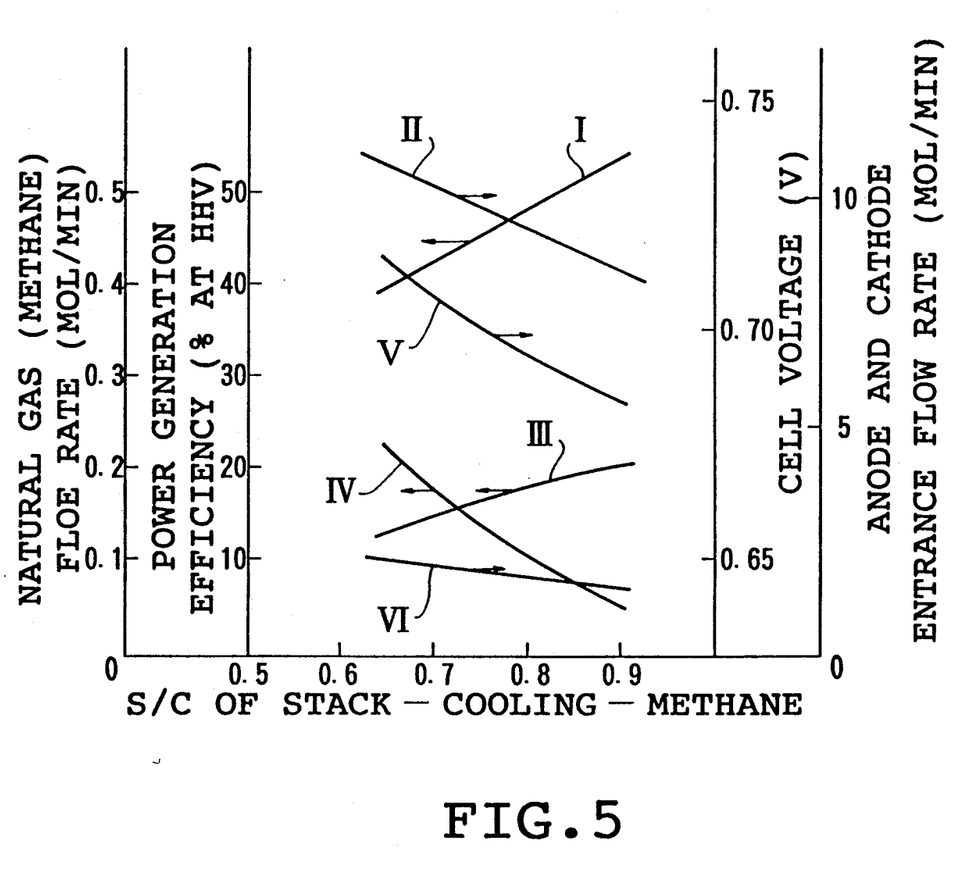
FIG. 5 shows a relation between a fuel utilization ratio of an anode and plant performances.

The fuel utilization ratio UF of the anode 3 of the fuel cell stack S and the plant performances are shown in FIG. 5. FIG. 5 shows a result of a case, like the foregoing one, where the fuel cell entrance temperature was set to 550° C., the cell exit temperature to 700° C., the external reformer device 37 entrance temperature to 550° C., the external reformer 37 exit temperature to 720° C., the steam/carbon ratio (s/c) of the natural gas for the processing and the stack-cooling to 3, the air excessive ratio EA of the combustion section of the external reformer to 1.2 and the flow rate EJ of the ejector 62 to 1.0.

The power generation efficiency EF exceeds 50% when the fuel utilization ratio UF was about 82%, as indicated by the curve I. The cell voltage (VOLT) decreases as the fuel utilization ratio UF increases, as indicated by the curve II. This is because $H_2$ and CO concentrations in the anode 3 drop respectively. The flow rate of the natural gas (methane) for the stack-cooling increases as the fuel utilization ratio JF increases, as indicated by the curve III. This is because the gas flow rate decreases and the cooling ability of the anode and the cathode drops as the fuel utilization ratio increases. On the other hand, the flow rate of the natural gas (methane) for the processing decreases as the fuel utilization ratio UF increases, as indicated by the curve IV. The two flow rates meet when the fuel utilization ratio is 72%. In FIG. 5, the curve V represents the flow rate of the gas going to the cathode 2 and the curve IV represents the flow rate of the gas going to the anode 3. As seen from FIG. 5, the plant performances are improved as the fuel utilization ratio is raised.

Figure 6:
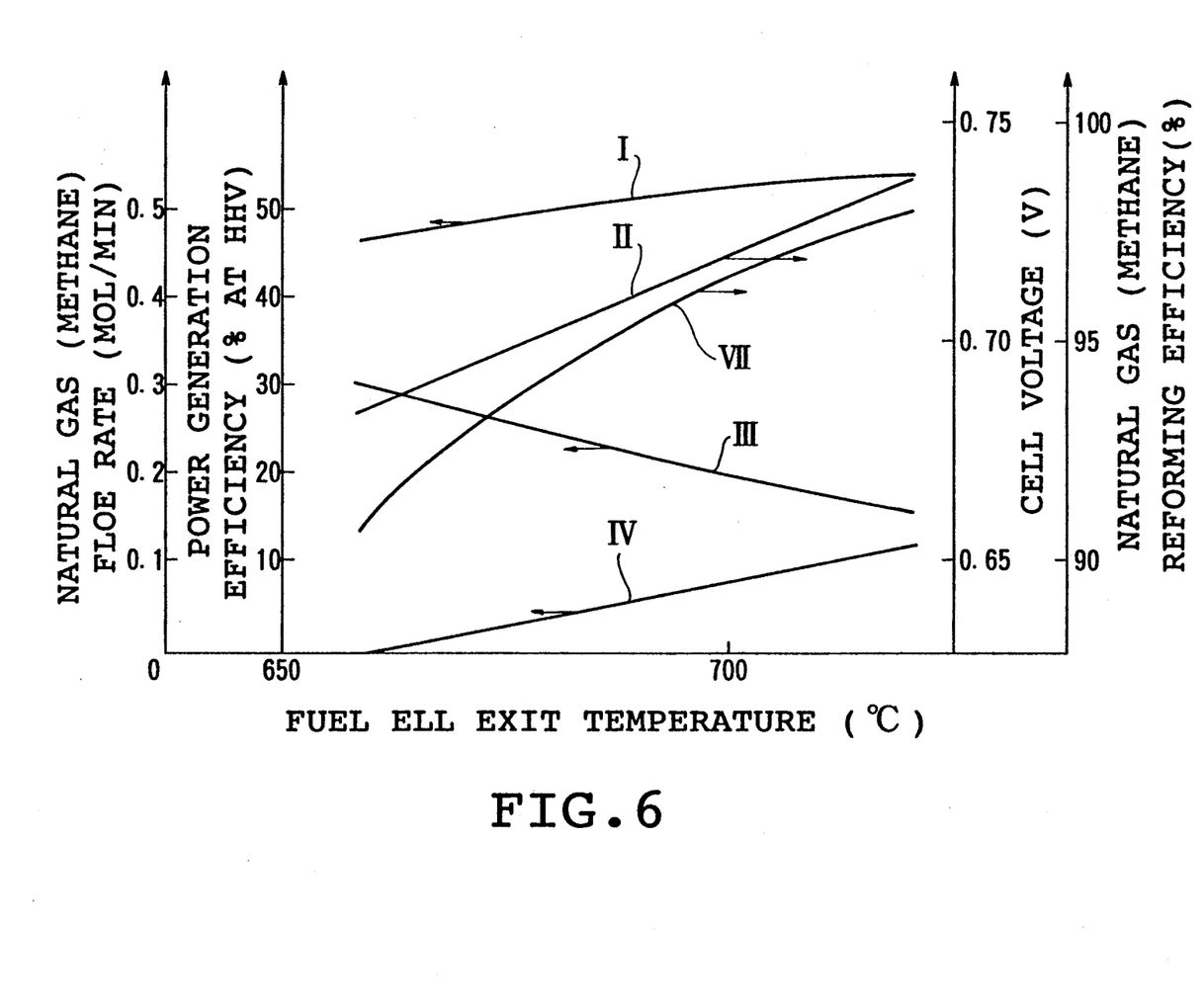
FIG. 6 shows a relation between an exit temperature of the fuel cell stack and the plant performances.

FIG. 6 shows influence of the fuel cell stack S exit temperature on the plant performances according to an experiment under conditions of the fuel utilization ratio=85%, the fuel cell entrance temperature=550° C., the external reformer entrance temperature=550° C. and the external reformer exit temperature=720° C. Other conditions are same as the experiment of FIG. 5.

The plant power generation efficiency EF gradually increases as the fuel cell exit temperature rises, as indicated by the curve I. The reforming ratio of the natural gas (methane) of the cooling plate 33 increases as the fuel cell exit temperature rises, as indicated by the curve VII. The cell voltage VOLT also rises as the fuel cell exit temperature rises, as indicated by the curve II. The curve III indicates the flow rate of the natural gas (methane) for the stack-cooling and the curve IV indicates the natural gas (methane) for the processing.

Figure 7:
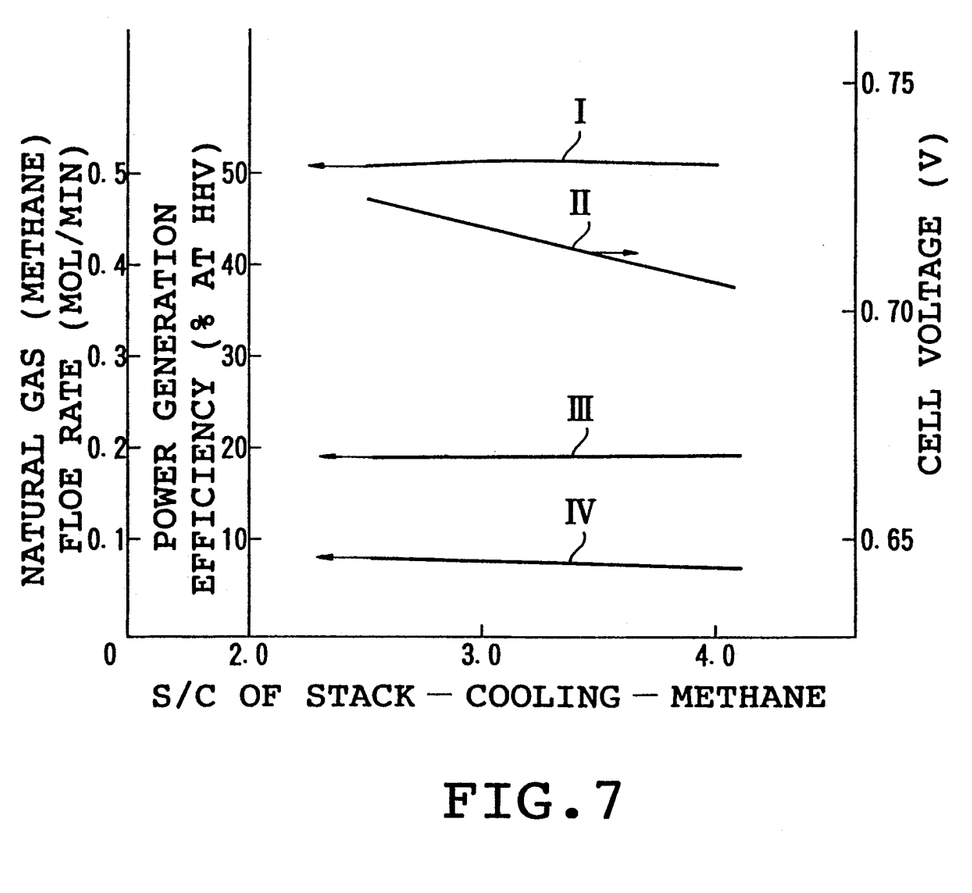
FIG. 7 shows a relation between a steam/carbon ratio of a stack-cooling-natural-gas and the plant performances.

Referring to FIG. 7, there is shown the plant performances in a case where the s/c ratio of the stack-cooling methane was raised in order to raise the reforming ratio of the raw material gas for the reforming. The fuel utilization ratio UF was set to 85%, the s/c ratio of the natural gas for the processing was set to 3 and other conditions were same as the case of FIG. 5.

The power generation efficiency EF was almost constant even if the s/c ratio of the stack-cooling methane was raised. However, the cell voltage VOLT decreased as the s/c ratio increased, as indicated by the curve II. The curve III indicates the flow rate of the natural gas (methane) for the stack-cooling and the curve IV indicates the flow rate of the natural gas (methane) for the processing.

Figure 8:
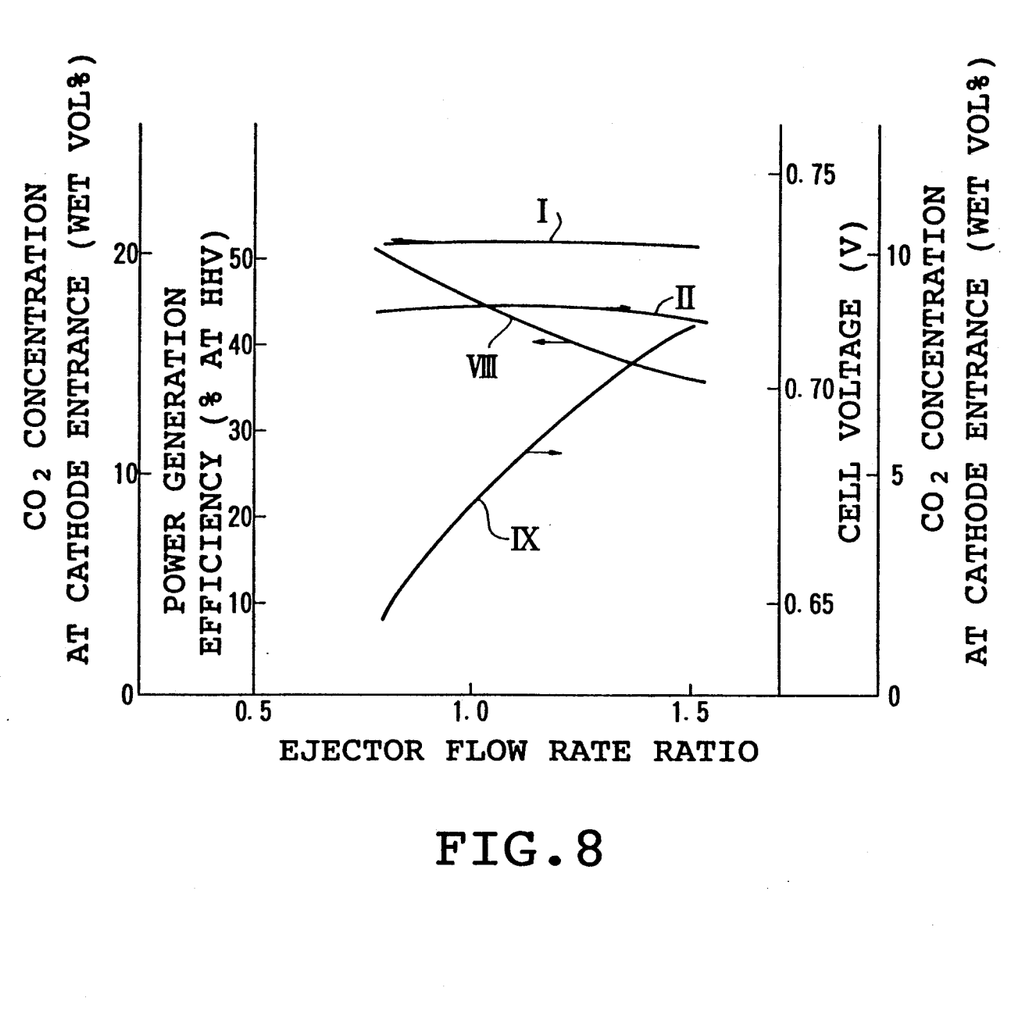
FIG. 8 depicts a relation between a flow rate of an ejector and the plant performances.

Referring now to FIG. 8, there is shown the influence of the flow rate ratio EJ of the ejector 62 on the plant performances. The fuel utilization ratio UF was set to 85% and other conditions were same as the case of FIG. 5.

The power generation efficiency EF was little influenced by flow rate ratio EJ of the ejector 62, as indicated by the curve I. The cell voltage VOLT was also little influenced by the flow rate ratio EJ of the ejector 62. Therefore, it is possible to control the pressure difference between the anode and the cathode without affected by power generation efficiency EF and/or the cell voltage very much. The curve VIII indicates the concentration (wet vol %) of $CO_2$ fed to the cathode and the curve IX indicates the concentration (wet vol %) of $O_2$ fed to the cathode.

In the above embodiment, the reformed gas reformed by the cooling plate 33 is directly fed to the anode 3. However, the reformed gas from the cooling plate 33 may be introduced to the entrance of the reforming section 38 of the external reformer 37 through the line 63. In such a case, a problem that the reforming ratio of the natural gas for the stack-cooling is eliminated. Accordingly, the reformation at the cooling plate 33 can be determined independently of the fuel cell stack exit temperature.

As described above, according to the power generation system using the molten carbonate fuel cells of the present invention the cooling plates defining the gas passages thereinside are inserted between some two adjacent fuel cells, the passages ar filled with the reforming catalyst, the external reformer is provided outside of the fuel cell stack, the raw material gas for the reformation and for the stack-cooling is introduced to the cooling plates with the steam to cause the reformation of the raw material gas, the raw material gas for the reformation and for the processing is introduced to the reforming section of the external reformer with the steam to reform the raw material gas, the reformed gas from the cooling plates and the reformed gas from the reforming section of the external reformer are introduced to the anode of the fuel cell stack, the anode exit gas is introduced to the combustion section of the external reformer and the combustion exhaust gas from the combustion section is fed to the cathode with the air.

Therefore, the present invention has following outstanding advantages:

(i) The cooling of the fuel cell stack is performed by the endothermic reforming reaction of the steam and the raw material gas for the reformation, which reaction takes place in the cooling plates disposed in the fuel cell stack. Hence, The fuel cell stack is cooled to an uniform temperature with respect to the cell plane as compared with the conventional cathode recycle type system and the anode recycle type system;

(ii) As just mentioned in (i), the cooling of the fuel cell stack is performed using the reforming reaction of the steam and the raw material gas for the reformation. Thus, it is not necessary to lower the carbon dioxide gas cocentration at the cathode entrance gas in order to cool the stack. Accordingly, the cell voltage is raised as compared with the conventional cathode recycle type system. As a result, the current density is raised and the fuel cell stack can be designed to be compact;

(iii) The reforming catalyst placed in the cooling plate is insulated from the carbonate so that the catalyst is not poisoned or deteriorated;

(iv) Since the cathode-recycling and the anode-recycling are not conducted in order to improve the sending end efficiency of the fuel cell power generation system, the power loss by the blower, which would otherwise recirculate a large amount of gas for the stack-cooling, is reduced;

(v) The indirect internal reformation type fuel cell stack has a drawback that the temperature distribution in the vertical direction in the fuel cell stack has some inclination. On the other hand, according to the present invention, since the external reforming device is provided next to the stack cooling plates and the flow rate ratio of these devices are controlled, it is possible to reduce the temperature difference in the vertical direction of the indirect internal reformation type fuel cell stack;

(vi) The cooling plates are inserted to the fuel cell stack (one cooling plate for several fuel cells). Thus, if one or some of the fuel cells become defective, a block or group of fuel cells which include such defective fuel cells are cut from the system by an electrical bypass using the cooling plates defining such a block or the cooling plates sandwiching the defective cells. Being defective means, for example, that the cell voltage is lower than a predetermined value when a rated current is applied.

(vii) A plurality of fuel cells are stack one after another with a predetermined number of rigid cooling plates being interposed at predetermined intervals. Thus, it is possible to prevent the cells from becoming defective; and (viii) Heat required for the external reformer is small since the heat is obtained from the reformation at the cooling plates. Consequently, the fuel utilization ratio of the fuel cell stack can be raised and the performances of the plant can be improved.

Furthermore, according to the present invention, since the combustion exhaust gas from the combustion section of the external reformer is pressurized and sent with the air (driving fluid) by use of the ejector, it is possible to control the pressure difference between the cathode and the anode of the fuel cell stack, an expensive heat exchanger is not required. Also, since the air flow rate of the ejector is not sensitive to the plant power generation efficiency and the cell voltage, the air flow rate of the ejector can be controlled in a wide range. In addition, in a case where the reformed gas from the cooling plates is fed to the reforming section entrance of the external reformer, the reforming ratio of the cooling plates can be selected regardless of the fuel cell stack exit temperature.

What is claimed is:

1. A power generation system using fuel cells, comprising:

a plurality of molten carbonate fuel cells, the fuel cells being stacked one after another via separators, each fuel cell having a cathode electrode, an anode electrode and a carbonate-soaked electrolyte tile sandwiched by the cathode and the anode electrodes, oxidant gas being fed to the cathode and fuel gas being fed to the anode;

cooling plates interposed between predetermined pairs of two adjacent fuel cells, each cooling plate directly contacting the adjacent fuel cells such that heat produced in the fuel cells is directly transferred to the cooling plates;

passages formed in each cooling plate for allowing raw-material-gas-for-reformation to flow through the passages;

reforming catalyst placed in the passages such that endothermic reactions take place in the passages as the raw-material-gas-for-reformation is reformed in the passages and whereby heat produced in the fuel cells is absorbed by the endothermic reaction in the cooling plates;

an external reformer provided outside of the fuel cell stack, the external reformer having a reforming section and a combustion section;

a stack-cooling-gas line connected to the passages of the cooling plates for introducing the raw-material-gas-for-the-reformation into the passages of the cooling plates;

a line for gas-for-processing connected to the reforming section of the external reformer for feeding raw-material-gas-for-processing to the reforming section;

an anode gas feed line for feeding to the anode reformed gas which has been reformed through the passages of the cooling plates and reformed gas which has been reformed by the reforming section of the external reformer;

an anode exit gas line for feeding anode exit gas to the combustion section of the external reformer;

a cathode gas feed line for feeding combustion exhaust gas discharged from the combustion section to the cathode with air; and a cathode exit gas line for discharging the cathode exit gas.

2. The system of claim 1, wherein the stack-cooling-gas line includes a natural gas feed line and a steam feed line.

3. The system of claim 1, wherein the line for the gas-for-processing includes a natural gas feed line and a steam feed line.

4. The system of claim 1, wherein the system further includes an ejector and the cathode gas feed line includes an air feed line and a line for combustion exhaust gas discharged from the combustion section, the combustion exhaust gas line being connected to the air feed line via the ejector.

5. The system of claim 1, wherein the anode gas feed line includes a line for directly introducing to the anode via the reforming section of the external reformer gas reformed through the passages of the cooling plates.

6. The system of claim 1, wherein the anode gas feed line includes a line for introducing to the anode via the reforming section of the external reformer part of gas reformed through the passages of the cooling plates.

7. The system of claim 1, wherein the anode gas feed line includes a line for introducing to the anode via the reforming section of the external reformer all of gas reformed through the passages of the cooling plates.

* * * * *